US012112644B2

(12) United States Patent
Jing

(10) Patent No.: US 12,112,644 B2
(45) Date of Patent: Oct. 8, 2024

(54) ACQUISITION OF FLIGHT PATH, GENERATION OF FLIGHT PIPE, AND DETERMINATION OF FLIGHT PATH

(71) Applicant: BEIJING AIRLANGO TECHNOLOGY CO., LTD., Beijing (CN)

(72) Inventor: Hua Jing, Beijing (CN)

(73) Assignee: BEIJING AIRLANGO TECHNOLOGY CO., LTD., Beijing (CN)

(*) Notice: Subject to any disclaimer, the term of this patent is extended or adjusted under 35 U.S.C. 154(b) by 229 days.

(21) Appl. No.: 17/590,637

(22) Filed: Feb. 1, 2022

(65) Prior Publication Data

US 2022/0157175 A1 May 19, 2022

Related U.S. Application Data

(63) Continuation of application No. PCT/CN2020/116232, filed on Sep. 18, 2020.

(30) Foreign Application Priority Data

Nov. 29, 2019 (CN) ........................ 201911201390.8

(51) Int. Cl.
*G08G 5/00* (2006.01)
*G08G 5/04* (2006.01)

(52) U.S. Cl.
CPC ........... *G08G 5/006* (2013.01); *G08G 5/0013* (2013.01); *G08G 5/0039* (2013.01);
(Continued)

(58) Field of Classification Search
CPC .... G08G 5/006; G08G 5/0013; G08G 5/0039; G08G 5/0069; G08G 5/0091;
(Continued)

(56) References Cited

U.S. PATENT DOCUMENTS 9,997,080 B1 * 6/2018 Chambers .............. B64U 10/13
10,134,291 B2 11/2018 Chan et al.
(Continued)

FOREIGN PATENT DOCUMENTS

CN 104914875 A 9/2015
CN 105185163 A 12/2015
(Continued)

OTHER PUBLICATIONS

The State Intellectual Property Office of People's Republic of China, Second Office Action in Patent Application No. CN201911201390.8 issued on Jul. 4, 2022, which is a foreign counterpart application corresponding to this U.S. Patent Application, to which this application claims priority.

(Continued)

*Primary Examiner* — Shon G Foley
(74) *Attorney, Agent, or Firm* — Kolitch Romano Dascenzo Gates LLC

(57) ABSTRACT

A method for acquiring a flight path is provided. The method for acquiring a flight path includes: acquiring a flight path acquisition request of a target aircraft, where the flight path acquisition request includes a starting location and a destination location of the target aircraft; acquiring one or more reference flight pipes based on the starting location and the destination location, where each reference flight pipe corresponds to pipe attribute information; determining occupancy information of the reference flight pipes by other aircrafts; and determining a target flight pipe from the reference flight pipes according to the pipe attribute information and the occupancy information, and acquiring a target flight path of the target aircraft based on the target flight pipe.

7 Claims, 9 Drawing Sheets

(52) U.S. Cl.
CPC ......... *G08G 5/0069* (2013.01); *G08G 5/0091* (2013.01); *G08G 5/045* (2013.01)

(58) Field of Classification Search
CPC .... G08G 5/045; G08G 5/0026; G08G 5/0034; G08G 5/003; G08G 5/04
See application file for complete search history.

(56) References Cited

U.S. PATENT DOCUMENTS

| | | | |
|---|---|---|---|
| 2016/0117931 | A1 | 4/2016 | Chan et al. |
| 2017/0025021 | A1 | 1/2017 | Song et al. |
| 2017/0092136 | A1 | 3/2017 | Agrawal |

FOREIGN PATENT DOCUMENTS

| | | | |
|---|---|---|---|
| CN | 106373434 | A | 2/2017 |
| CN | 106898160 | A | 6/2017 |
| CN | 108803660 | A | 11/2018 |
| CN | 109191925 | A | 1/2019 |
| CN | 109215398 | A | 1/2019 |
| CN | 109506654 | A | 3/2019 |
| CN | 109634304 | A | 4/2019 |
| CN | 110209202 | A | 9/2019 |
| CN | 110276991 | A | 9/2019 |
| CN | 110388912 | A | 10/2019 |

OTHER PUBLICATIONS

The State Intellectual Property Office of People's Republic of China, Second Office Action in Patent Application No. CN202110192185.0 issued on Jul. 4, 2022.

International Search Report of the International Searching Authority for State Intellectual Property Office of the People's Republic of China in PCT application No. PCT/CN2020/116232 issued on Dec. 18, 2020, which is an international application corresponding to this U.S. application.

The State Intellectual Property Office of People's Republic of China, First Office Action in Patent Application No. CN201911201390.8 issued on Dec. 1, 2021, which is a foreign counterpart application corresponding to this U.S. Patent Application, to which this application claims priority.

The State Intellectual Property Office of People's Republic of China, First Office Action in Patent Application No. CN202110192185.0 issued on Dec. 29, 2021, which is a foreign counterpart application corresponding to this U.S. Patent Application, to which this application claims priority.

* cited by examiner

ACQUISITION OF FLIGHT PATH, GENERATION OF FLIGHT PIPE, AND DETERMINATION OF FLIGHT PATH

This application is a continuation application of international application No. PCT/CN2020/116232, filed on Sep. 18, 2020 and entitled "Acquisition of flight path and generation of flight pipe", which claims priority to Chinese Patent Application No. 201911201390.8, entitled "Method, apparatus, and device for acquiring flight path, and method, apparatus, and device for generating flight pipe" and filed on Nov. 29, 2019, which is incorporated herein by reference in its entirety.

TECHNICAL FIELD

The present disclosure relates to the field of airspace management technologies, and in particular, to acquisition of a flight path, generation of a flight pipe, and determination of a flight path.

BACKGROUND

With the development of airspace management technologies, more and more aircraft are allowed to enter the airspace. In the airspace, aircrafts often need to follow the flight paths to fly. Therefore, how to acquire the flight path of the aircraft is the key to ensuring the flight safety of the aircraft.

SUMMARY

Embodiments of the present disclosure provide acquisition of a flight path, generation of a flight pipe, and determination of a flight path. The technical solutions are as follows:

According to one aspect, a method for acquiring a flight path is provided. The method includes:

- acquiring a flight path acquisition request of a target aircraft, where the flight path acquisition request includes a starting location and a destination location of the target aircraft;
- acquiring one or more reference flight pipes based on the starting location and the destination location, where each reference flight pipe corresponds to pipe attribute information;
- determining occupancy information of the reference flight pipes by other aircrafts; and
- determining a target flight pipe from the reference flight pipes according to the pipe attribute information and the occupancy information, and acquiring a target flight path of the target aircraft based on the target flight pipe.

According to one aspect, a method for generating a flight pipe is provided. The method includes:

- acquiring map information;
- determining ground data according to the map information, where the ground data includes one or two of a road network and an area that does not include any road network; and
- mapping the ground data based on a type of the ground data to generate a plurality of flight pipes.

According to one aspect, a method for determining a flight path is provided, including:

- determining one or a plurality of flight pipes, where the plurality of flight pipes are connected in sequence, positioning information of the flight pipe includes a longitude and a latitude of an endpoint of the flight pipe, and when a shape of the flight pipe is non-linear, the positioning information further includes a longitude and a latitude of a geometric center of the flight pipe; and
- determining a shape and positioning information of a flight path according to the shapes and the positioning information of the one or plurality of flight pipes.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DETAILED DESCRIPTION

To make objectives, technical solutions, and advantages of the embodiments of the present disclosure clearer, implementations of the present disclosure are further described in detail with reference to the accompanying drawings.

With the development of airspace management technologies, more and more aircraft are allowed to enter the airspace. In the airspace, aircrafts often need to follow the flight paths to fly. Therefore, how to acquire the flight path of the aircraft is the key to ensuring the flight safety of the aircraft.

In the related art, in response to a target aircraft being located in a flyable area, a flight path of the aircraft is determined based on a current location of the target aircraft, a destination location, and information about buildings in the flyable area.

However, when there are a plurality of aircrafts in flight in the flyable area, since the aircrafts independently acquire the flight path and fly according to the method provided by the related art, there is a possibility of collision between the aircrafts. It can be seen that the safety of acquiring the flight path according to the method provided by the related art is not high.

Figure 1:
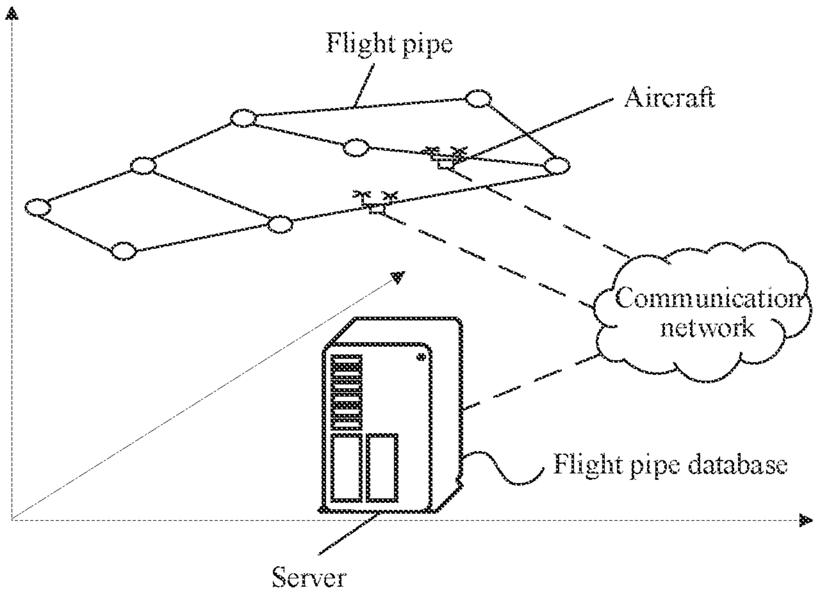
FIG. 1 is a schematic diagram of an implementation environment according to an embodiment of the present disclosure.

An embodiment of the present disclosure provides a method for acquiring a flight path and a method for generating a flight pipe. This method may be applied to an implementation environment as shown in FIG. 1. In FIG. 1, there are two or more aircrafts and a server. The aircrafts are communicably connected to the server through a communication network to send a flight path acquisition request to the server and acquire a target flight path returned by the server. A flight pipe database is stored in the server, so that the above-mentioned target flight path is determined based on flight pipes stored in the flight pipe database.

It should be noted that the server may be one server, a server cluster composed of a plurality of servers, or a cloud computing service center. Those skilled in the art should understand that the above-mentioned servers are merely examples, and other existing or future terminals or servers that are applicable to the embodiments of the present disclosure should also fall within the scope of protection of the embodiments of the present disclosure, and therefore are incorporated herein by reference.

Figure 2:
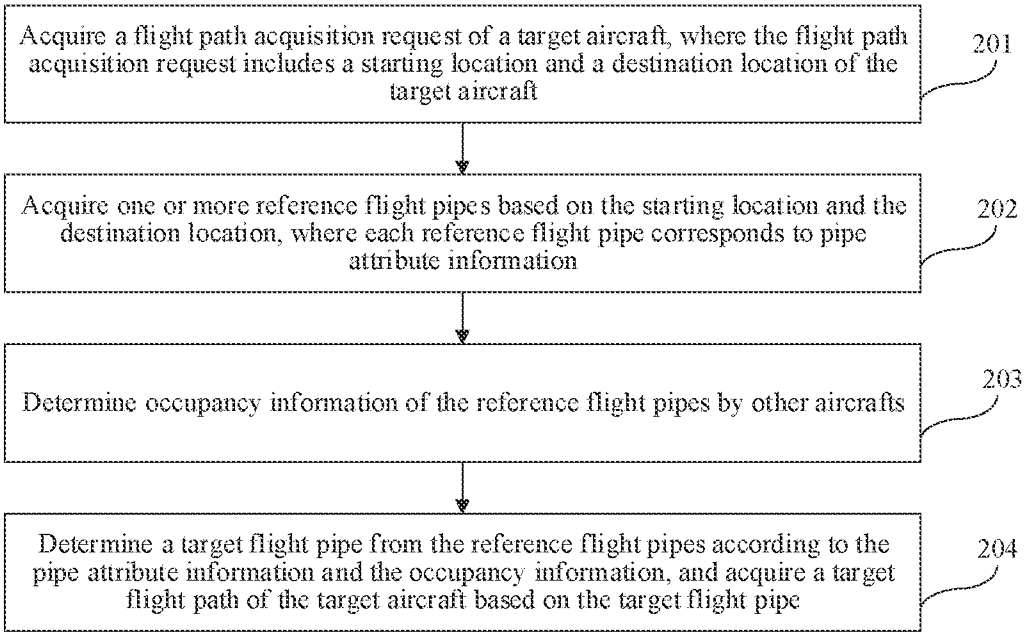
FIG. 2 is a flowchart of a method for acquiring a flight path according to an embodiment of the present disclosure.

Based on the implementation environment shown in FIG. 1, referring to FIG. 2, an embodiment of the present disclosure provides a method for acquiring a flight path. This method may be applied to the server shown in FIG. 1. As shown in FIG. 2, the method includes the following steps:

Step 201: Acquire a flight path acquisition request of a target aircraft, where the flight path acquisition request includes a starting location and a destination location of the target aircraft.

Figure 3:
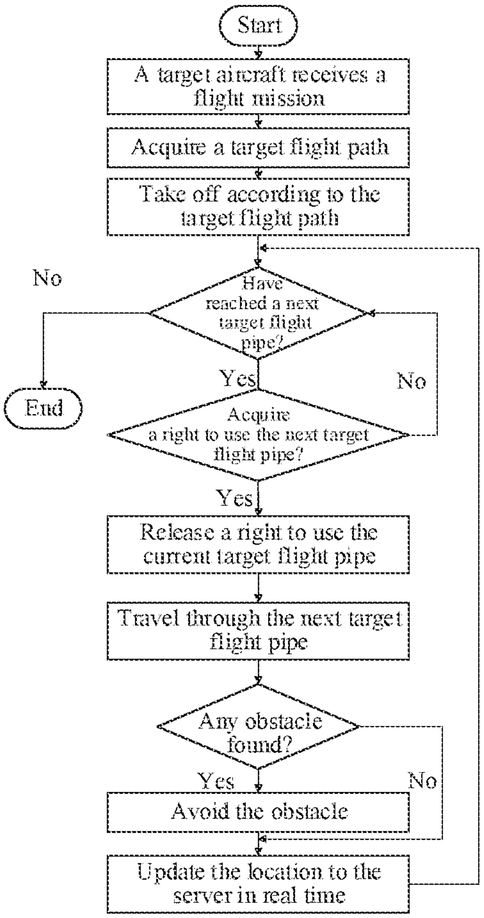
FIG. 3 is a flowchart of a method for acquiring a flight path according to an embodiment of the present disclosure.

The starting location of the target aircraft may be a current location of the target aircraft, or any reference location. Referring to FIG. 3, the target aircraft may receive a flight mission, and determine the destination location of the target aircraft according to the flight mission. In an implementation, the target aircraft may be communicably connected to a user terminal, and the user terminal provides an input interface for the destination location, and in response to detecting a location inputted by a user from the input interface, transmits the detected location to the target aircraft as the destination location. Then, the target aircraft may send the flight path acquisition request including the starting location and the above-mentioned destination location to the server, so that the server acquires the flight path acquisition request of the target aircraft.

Alternatively, in an implementation, the user terminal may directly send the detected destination location to the server, so that the server acquires current locations of one or more deployable aircrafts based on the destination location, uses the aircraft that meets a condition as the target aircraft, and uses the current location of the target aircraft as the starting location. The condition that needs to be met is not limited in this embodiment. For example, the target aircraft may be an aircraft of which the current location has the shortest linear distance to the destination location.

Step 202: Acquire one or more reference flight pipes based on the starting location and the destination location, where each reference flight pipe corresponds to pipe attribute information.

The reference flight pipe is a virtual pipe in the airspace, i.e., the reference flight pipe is a part of the three-dimensional space in the airspace. The entire airspace may be quantified and divided using reference flight pipes, so as to facilitate subsequent acquisition of the target flight path of the target aircraft. In this embodiment, the pipe attribute information corresponding to the reference flight pipe includes but is not limited to the number of aircrafts that can be carried in the reference flight pipe at the same time, length, signal noise ratio (SNR), maximum flight pipe velocity, maximum aircraft size, maximum aircraft weight, weather, etc.

The number of aircrafts that can be carried in the reference flight pipe at the same time may be one or more, which may be set according to experience or actual needs. The smaller the number of aircrafts that can be carried in the reference flight pipe at the same time, the lower the probability of collision between the aircrafts. When the number of aircrafts that can be carried in the reference flight pipe at the same time is one, it means that only one aircraft is allowed to pass at the same moment, so the passing aircraft will not collide with other aircrafts in the reference flight pipe, ensuring high safety.

In addition, the SNR is used for indicating the propagation quality of a network signal in the reference flight pipe. The larger the SNR, the worse the propagation quality. The network signal may need to be retransmitted multiple times, resulting in a higher network delay in the reference flight pipe. Because of such a network delay, the transmission of various instructions by the server to the aircraft will be delayed, reducing the flight safety of the aircraft. For example, in response to the aircraft being at a location A, the server sends a stop instruction to the aircraft, where the stop instruction is used for instructing the aircraft to stop at the location A. However, due to the network delay, the aircraft can only receive the instruction after flying from the location A to a location B. As a result, the aircraft that should have stopped at the location A will continue to fly to the location B before stopping. Therefore, it is necessary to set the above-mentioned maximum flight pipe velocity, i.e., a maximum allowable flight speed of all aircrafts flying in the reference flight pipe, to prevent the aircraft from flying a longer distance (that is, the distance between the location A and the location B in the above example is longer) during the time period from the time when the server sends the instruction to the time when the aircraft receives the instruction, thereby ensuring the flight safety of the aircraft.

Figure 4:
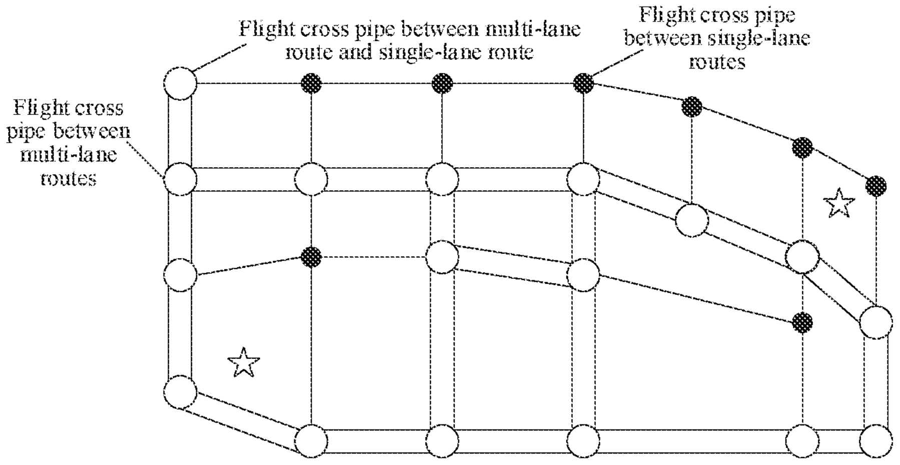
FIG. 4 is a schematic diagram showing a mapping according to an embodiment of the present disclosure.

In an exemplary embodiment, the acquiring one or more reference flight pipes based on the starting location and the destination location includes: acquiring initial flight pipes; and determining the reference flight pipes from the initial flight pipes based on the starting location and the destination location. A method of acquiring the initial flight pipes will be set forth later, so the details will not be described here. No matter how the initial flight pipes are acquired, in this embodiment, it is feasible to use the starting location and the destination location as diagonal points to determine a reference area (for example, a rectangular area) on the ground, and determine the reference flight pipes from the initial flight pipes based on a rule that areas on the ground that are mapped to the determined reference flight pipes can cover the reference area. Referring to FIG. 4, two five-pointed stars in FIG. 4 represent the starting location and the destination location respectively. By determining the initial flight pipes shown in FIG. 4 as the reference flight pipes, the areas on the ground that are mapped to the determined reference flight pipes can cover the reference area determined based on the starting location and the destination location. Of course, in addition to the above method of determining the reference flight pipes, the initial flight pipes may also be directly used as the reference flight pipes in this embodiment.

Step 203: Determine occupancy information of the reference flight pipes by other aircrafts.

Considering that there may be one or more other aircrafts in the airspace in addition to the target aircraft and other aircrafts may occupy the above-mentioned reference flight pipe (occupation of the reference flight pipe by another aircraft means that the another aircraft is located in a three-dimensional space corresponding to the reference flight pipe), the occupancy information of the reference flight pipes by other aircrafts needs to be determined, so that the flight path of the target aircraft can be determined based on the occupancy information of the reference flight pipes by other aircrafts. In an implementation, the determining occupancy information of the reference flight pipes by other aircrafts includes: which reference flight pipe is occupied by each of the other aircrafts, a moment when the occupation of the reference flight pipe starts, a moment when the occupation of the reference flight pipe ends.

Step 204: Determine a target flight pipe from the reference flight pipes according to the pipe attribute information and the occupancy information, and acquire a target flight path of the target aircraft based on the target flight pipe.

As can be learned from the description in step 202, the pipe attribute information includes the number of aircrafts that can be carried at the same time. In an implementation, for any reference flight pipe, time periods in which the reference flight pipe can be used as the target flight pipe can be determined according to the number of aircrafts that can be carried in the reference flight pipe at the same time and the occupancy information. For example, in response to the number of aircrafts that can be carried in the reference flight pipe at the same time being one, the reference flight pipe cannot be used as the target flight pipe during a time period in which any one of the other aircrafts occupies the reference flight pipe. In response to the number of aircraft that can be carried in the reference flight pipe at the same time being two, when any one of the other aircrafts occupies the reference flight pipe, the reference flight pipe can still be used as the target flight pipe; and the reference flight pipe cannot be used as the target flight pipe only during a time period in which any two of the other aircrafts occupy the reference flight pipe at the same time. Cases in which the number of aircrafts that can be carried at the same time is three or more can be deduced by analogy, so the details will not be repeated here.

In addition, after the time period(s) during which each reference flight pipe can be used as the target flight pipe is/are determined, the reference flight pipes may further be screened based on information such as the SNR, maximum flight pipe velocity, maximum aircraft size, maximum aircraft weight, and weather in the pipe attribute information, so as to finally determine the target flight pipe(s). For example, the reference flight pipes of which the SNR is greater than an SNR threshold (that is, the network delay is too high), the maximum aircraft size is less than a target aircraft size, the maximum aircraft weight is less than a target aircraft weight, and weather is abnormal, e.g., rainy or snowy, may be deleted from the reference flight pipes that can be used as the target flight pipe.

Then, one or more target flight pipes may be determined from the remaining reference flight pipes after the screening according to an actual need, so as to combine to obtain the target flight path. For example, the actual need may be that the distance of the target flight path is the shortest, in which case the reference flight pipes with the shortest total length are selected from the reference flight pipes as the target flight pipes. Alternatively, the actual need may be that the flight time of the target flight path is the shortest, in which case the target flight pipes may be determined based on the lengths of the reference flight pipes and the maximum flight pipe velocity allowed by each reference flight pipe, so that the target aircraft can fly from the starting location to the destination location in the shortest time along the target flight path composed of the target flight pipes.

Alternatively, the actual need may be that the flight safety of the target flight path is the highest, in which case the target flight pipe may be determined according to one or two of the SNR and the weather. For example, reference flight pipes with a lower average SNR are selected as the target flight pipes, so that the target aircraft can receive an instruction from the server in a timely manner when flying along the target flight path, thereby ensuring safety. Alternatively, reference flight pipes with better weather conditions (for example, clear and no wind) as the target flight pipes, so that the target aircraft can fly more smoothly along the target flight path, thereby ensuring flight safety.

Alternatively, the actual need may be that the target flight path can avoid public anxiety. Public anxiety refers to the anxiety caused by the public seeing the presence of aircrafts in the airspace. Therefore, reference flight pipes at different heights may be selected as the target flight pipes according to the degree of population density. For example, in areas with dense populations (such as commercial districts and residential areas), higher reference flight pipes may be determined as the target flight pipes; in areas with sparse populations (such as mountain areas), lower reference flight pipes may be determined as the target flight pipes. In this way, the target flight paths at different heights can be selected as required.

It should be noted that the determined target flight pipes have a spatial sequence, so that the target aircraft can fly from the starting location to the destination location by sequentially passing through the target flight pipes according to this sequence. In addition, each of the determined target flight pipes corresponds to one occupancy start time, and the sequence of the occupancy start times is the same as the above-mentioned spatial sequence. For any target flight pipe, the occupancy start time is an estimated time when the target aircraft starts to occupy the target flight pipe, i.e., a time at which the target aircraft flies into the target flight pipe. For example, the target flight pipe closest to the starting location is the first target flight pipe in space, and the occupancy start time of the first target flight pipe may be 1 minute after takeoff. The target flight pipe adjacent to the first target flight pipe is the second target flight pipe in space, and the occupancy start time of the second target flight pipe may be 5 minutes after takeoff.

In an exemplary embodiment, the target flight pipes may be determined according to the following steps A1-A3:

Step A1: Obtain an undirected graph of the reference flight pipes based on a connection relationship between the reference flight pipes by taking the reference flight pipes as endpoints.

Figure 5:
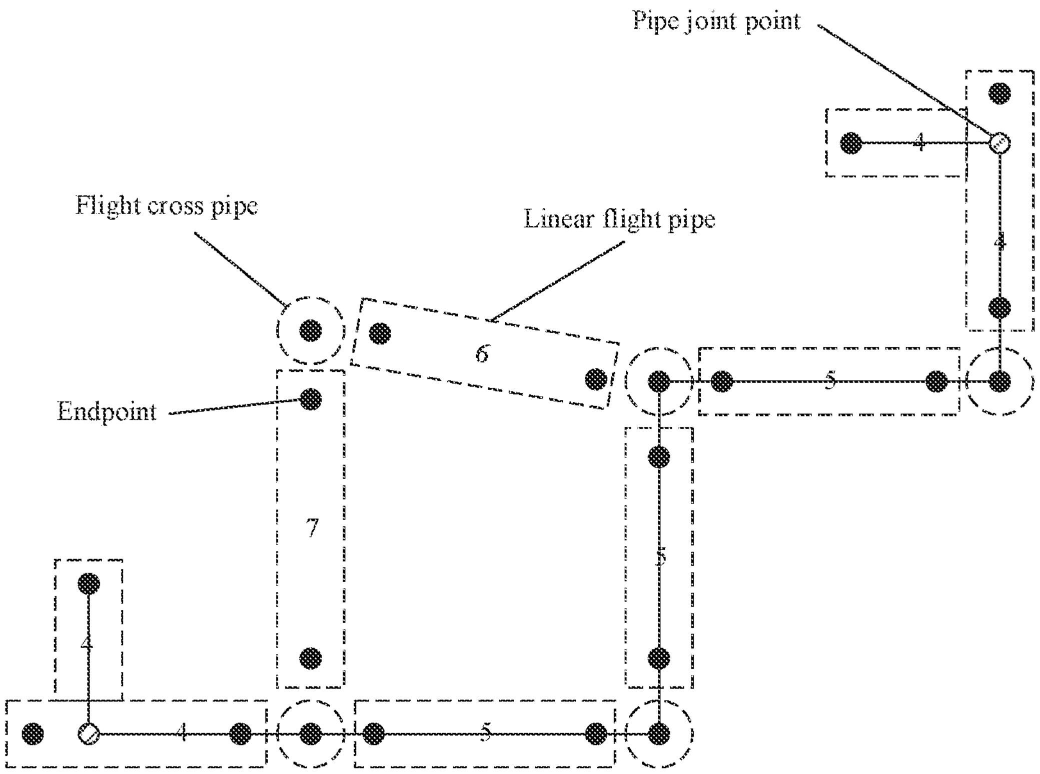
FIG. 5 is a schematic diagram showing a mapping according to an embodiment of the present disclosure.

The undirected graph of the reference flight pipes may be as shown in FIG. 5, where a flight cross pipe in the reference flight pipes may be used as an endpoint (Pipe Terminal). The flight cross pipe refers to a flight pipe with two or more exits. Each exit corresponds to one direction, and the directions corresponding to different exits are different. For example, the flight cross pipe may be a T-shaped flight pipe with three outlets, a crisscross flight pipe with four outlets, etc. For a linear flight pipe with only two exits in the reference flight pipe, two ends of the pipe are each regarded as one endpoint, and the linear flight pipe is represented by the two endpoints. For a method of obtaining the undirected graph, after the initial flight pipes are obtained by the above division, all the initial flight pipes may be used as endpoints to obtain the undirected graph of the initial flight pipes. After the reference flight pipes are determined subsequently, the undirected graph of the reference flight pipes may be directly acquired from the undirected graph of the initial flight pipes. Alternatively, after the reference flight pipes are determined, the undirected graph may be generated in real time according to the determined reference flight pipes.

Step A2: Determine a cost function value of each endpoint based on the pipe attribute information and the occupancy information.

For any endpoint, the cost function value is used for indicating a cost required to pass through the endpoint. The higher the cost function value, the greater the cost required to pass through the endpoint. Therefore, the endpoint with a smaller cost function value is often selected during the comparison and selection process. In an implementation, a cost function may be expressed by the following formula:

$$f(n)=g(n)+w(\text{pipe},t_1,t_2)h(n)$$

In the above formula, f(n) is the cost function, w(pipe, $t_1$, $t_2$) is a weight of the reference flight pipe where the endpoint is located from moments $t_1$ to $t_2$, and a time between the moments $t_1$ and $t_2$ is a time during which the target aircraft is located in the reference flight pipe. In response to determining based on the occupancy information that the number of other aircrafts already in the reference flight pipe is less than the number of aircrafts that can be carried in the reference flight pipe at the same time, which indicates that the target aircraft can enter the reference flight pipe, the weight is set to 1. In response to determining based on the occupancy information that the number of other aircrafts already in the reference flight pipe is equal to the number of aircrafts that can be carried in the reference flight pipe at the same time, which indicates that the target aircraft cannot enter the reference flight pipe, the weight is set to positive infinity. It can be seen that the cost function values of the reference flight pipes that the target aircraft cannot enter are infinitely great, so these reference flight pipes will not be used as the target flight pipes in the subsequent selection process, thereby ensuring the safety of the target aircraft.

In addition, g(n) is an actual cost from the starting location to the current endpoint, and h(n) is an estimated cost from the current endpoint to the destination location. The actual cost and the estimated cost may be determined based on the pipe attribute information. For example, length information in the pipe attribute information may be used as an indicator to determine the actual cost. In this case, the actual cost from the starting location to the current endpoint may be the sum of the lengths of the reference flight pipes that the aircraft has passed from the starting location to the current endpoint. The estimated cost from the current endpoint to the destination location may be a straight-line distance between the current endpoint and the destination location, or may be other distances calculated based on the straight-line distance according to experience. Alternatively, the actual cost and the estimated cost may be determined comprehensively based on one or more of the information included in the pipe attribute information. When the determination is made based on more than one piece of information, the more than one piece of information may be weighted to obtain the actual cost and the estimated cost.

According to the above description, the actual cost g(n), the weight w(pipe, $t_1$, $t_2$), and the estimated cost h(n) can be determined. Therefore, the cost function value of any endpoint can be determined, and the target flight pipe can be determined based on the determined cost function value.

Step A3: Determine the endpoint with a smallest sum of cost function values between the starting location and the destination location as the target flight pipe.

Since the endpoints of the linear flight pipe have the above-mentioned cost function value, the linear flight pipe where the endpoint with the smaller cost function value is located is selected as the target flight pipe at the endpoints of each flight cross pipe. For example, in FIG. 5, among reference flight pipes with a cost function value of 7 and a cost function value of 5, the reference flight pipe with the cost function value of 5 is selected as the target flight pipe. Finally, the reference flight pipe where the endpoint with a smallest sum of cost function values is located is determined as the target flight pipe.

It should be noted that because the estimated costs of the endpoint and the destination location are considered in the cost function value, the endpoint with a smaller cost function value has a smaller estimated cost, and a smaller estimated cost indicates that the endpoint is closer to the destination location. Because the endpoint with the smaller cost function value is selected, each endpoint selected is closer to the destination location or directed toward the destination location, so the target flight pipe determined in this embodiment can reach the destination location from the starting location. This determination method is also called heuristic search, which is a directional search method based on the endpoints of the reference flight pipes, and therefore requires searching of fewer endpoints, has high search efficiency, and requires fewer storage resources.

Optionally, the acquiring a target flight path of the target aircraft based on the target flight pipe includes: determining a takeoff pipe of the target aircraft according to the starting location and a location of the target flight pipe corresponding to a smallest occupancy start time among the target flight pipes; determining a landing pipe of the target aircraft according to the destination location and a location of the target flight pipe corresponding to a largest occupancy start time among the target flight pipes; and using the takeoff pipe, the target flight pipe, and the landing pipe as the target flight path.

Because the occupancy start time of a target flight pipe is the time at which the target aircraft flies into the target flight pipe, the target flight pipe with the smallest occupancy start time is the first target flight pipe that the target aircraft flies into after takeoff. That is to say, the target flight pipe with the smallest occupancy start time in the target flight pipes is the target flight pipe closest to the starting location. Therefore, a takeoff pipe needs to be determined according to the location of the target flight pipe with the smallest occupancy start time and the starting location, so that the target aircraft takes off from the starting location and enters the target flight pipe. In response to a point obtained by vertical mapping of the starting location being a point on the target flight pipe with the smallest occupancy start time, the takeoff pipe is 1-shaped; otherwise, the takeoff pipe is L-shaped.

The target flight pipe with the largest occupancy start time is the last target flight pipe that the target aircraft flies into after takeoff. Correspondingly, a landing pipe is further determined according to the location of the target flight pipe with the largest occupancy start time and the destination location, so that the target aircraft can land from the target flight pipe with the largest occupancy start time to the destination location. Therefore, the target aircraft can reach the destination location from the starting location according to the sequence of the takeoff pipe, the target flight pipe, and the landing pipe. Therefore, the takeoff pipe, the target flight pipe, and the landing pipe can be used as the target path of the target aircraft. The takeoff pipe and the landing pipe may be planned before the takeoff of the target aircraft, or may be dynamically planned during the flight of the target aircraft.

In addition, in this embodiment, the takeoff pipe and the landing pipe may also be determined based on the above-mentioned manner using the cost function value. In this manner, referring to FIG. 5, one or more takeoff pipes may be determined between the starting location and surrounding reference flight pipes, and an intersection between each takeoff pipe and the reference flight pipe is a pipe joint point. Therefore, any takeoff pipe can be represented by two endpoints, namely, the starting location and the pipe joint point, and a reference flight pipe connected to the takeoff pipe is represented by the pipe joint point and one endpoint of the reference flight pipe. Correspondingly, one or more landing pipes may also be determined between the destination location and surrounding reference flight pipes. The landing pipe is represented by two endpoints, namely, the pipe joint point and the destination location. A reference flight pipe connected to the landing pipe is represented by the pipe joint point and one endpoint of the reference flight pipe. In this way, the target flight path can be determined in such a way that the sum of the cost function values of the endpoints of the takeoff pipe, the reference flight pipe, and the landing pipe is the smallest.

In an optional implementation, the determining a target flight pipe from the reference flight pipes according to the pipe attribute information and the occupancy information includes the following steps B1-B4:

B1: Use the one or more reference flight pipes as endpoints, where any reference flight pipe corresponds to at least one endpoint.

For a method of using the reference flight pipes as the endpoints, reference can be made to the description in A1 above, so the details will not be repeated here.

B2: In response to the number of the reference flight pipes being more than one, obtain an undirected graph based on a connection relationship between different reference flight pipes and the endpoints.

When there are a plurality of reference flight pipes, there is a connection relationship between different reference flight pipes because the plurality of reference flight pipes are connected to each other. The endpoints used for representing the reference flight pipes are connected according to the connection relationship between different reference flight pipes, so as to obtain an undirected graph. Exemplarily, the undirected graph may be as shown in FIG. 5. Correspondingly, when the number of reference flight pipes is one, after the reference flight pipe is used as an endpoint, the endpoint can be used as the undirected graph.

B3: Determine a cost function value of each endpoint in the undirected graph based on the pipe attribute information and the occupancy information.

For a method of determining the cost function value, reference can be made to the description in A2 above, so the details will not be repeated here.

B4: Determine the reference flight pipe corresponding to the endpoint with a smallest sum of cost function values between the starting location and the destination location as the target flight pipe.

For a method of determining the target flight pipe, reference can be made to the description in A3 above, so the details will not be repeated here.

In an optional implementation, after the acquiring a target flight path of the target aircraft based on the target flight pipe, the method further includes: for any target flight pipe, acquiring updated pipe attribute information and updated occupancy information of the target flight pipe at a current moment in response to detecting that the target aircraft arrives at the target flight pipe; and allowing the target aircraft to enter the target flight pipe in response to determining that the target flight pipe is available according to the updated pipe attribute information and the updated occupancy information.

After the target aircraft takes off, the target aircraft and other aircrafts may encounter unexpected situations during the flight, resulting in the change of the occupancy information of each target flight pipe to updated occupancy information. For example, original occupancy information of a target flight pipe is that it is occupied by another aircraft from moments A to B, but the another aircraft flies too slow due to a fault, resulting in that the occupation of the target flight pipe does not end until a moment C after the moment B. In this case, the occupancy information of the target flight pipe changes to the updated occupancy information. In addition, the pipe attribute information of the target flight pipe may change to updated pipe attribute information, for example, the SNR and weather in the pipe attribute information may change. It can be seen that because both the occupancy information and the pipe attribute information have been updated, the previously determined target flight pipe may not be suitable for continuing to serve as the target flight pipe at the current moment.

Therefore, every time it is detected that the target aircraft reaches a target flight pipe, real-time updated pipe attribute information and updated occupancy information of the target flight pipe may be acquired, so as to determine that the target flight pipe is indeed still suitable for flight of the target aircraft at the current moment, i.e., the target flight pipe is available. In response to determining that the target flight pipe is available, the target aircraft is allowed to enter the target flight pipe, so as to prevent the target aircraft from colliding with other aircrafts, thereby improving flight safety.

Correspondingly, an updated target flight path is determined in response to determining that the target flight pipe is unavailable according to the updated pipe attribute information and the updated occupancy information; and the updated target flight path is sent to the target aircraft. That is to say, in response to the target flight pipe being unavailable, the target flight path may be updated based on the current location of the target aircraft and the destination location, so that the target aircraft can fly to the destination location according to the updated target flight path.

In an exemplary embodiment, before the acquiring updated pipe attribute information and updated occupancy information of the target flight pipe at a current moment, the method further includes: predicting a reference time for the target aircraft to enter the target flight pipe; acquiring an actual flight time of the target aircraft; and determining that the target aircraft reaches the target flight pipe in response to detecting that a difference between the actual flight time of the target aircraft and the reference time is less than a threshold.

In an implementation, the server may predict the reference time and store the reference time locally, record an actual flight time of the target aircraft after detecting the target aircraft, and when a difference between the reference time and the time flight time is less than a threshold, trigger a determination of whether the target flight pipe is available. In response to determining that a next target flight pipe is available, the target aircraft is granted a right to use the next target flight pipe. After receiving the right to use the next target flight pipe, the target aircraft may release a right to use the current target flight pipe, so that the server can dispatch the current target flight pipe to other aircrafts for use. After completing the release, the target aircraft can fly into the next target flight pipe.

Alternatively, the server may also send the reference time to the target aircraft, and the target aircraft records the actual flight time by itself, and compares the reference time with the actual flight time. In a case where the difference between the reference time and the actual flight time is less than the threshold, the target aircraft may send a request for use of the target flight pipe to the server, where the request for use is used for acquiring the right to use the next target flight pipe that is reached. After receiving the request for use, the server triggers a determination of whether the next target flight pipe is available, so as to determine whether to grant the target aircraft the right to use the next target flight pipe.

Of course, in addition to determining that the target aircraft reaches the target flight pipe when the difference between the actual flight time and the reference time is less than the threshold, the server may also acquire the location of the target aircraft continuously or at intervals of the reference time, or the target aircraft may upload the current location to the server at intervals of the reference time. In response to a distance between the location acquired by the server and a starting end of the target flight pipe being less than a reference distance, it is determined that the target aircraft reaches the target flight pipe, and therefore, the determination of whether the target flight pipe is available is triggered.

Based on the above, in this embodiment, the airspace is quantified using the reference flight pipes, and the target flight path of the target aircraft is determined based on the pipe attribute information of the reference flight pipes and the occupancy information of the reference flight pipes by other aircrafts. Therefore, the target aircraft flies according to the target flight path determined by the method provided in the embodiments of the present disclosure, which can avoid collisions with other aircrafts, thereby not only ensuring flight safety, but also achieving centralized management and scheduling of aircrafts in the airspace.

Figure 6:
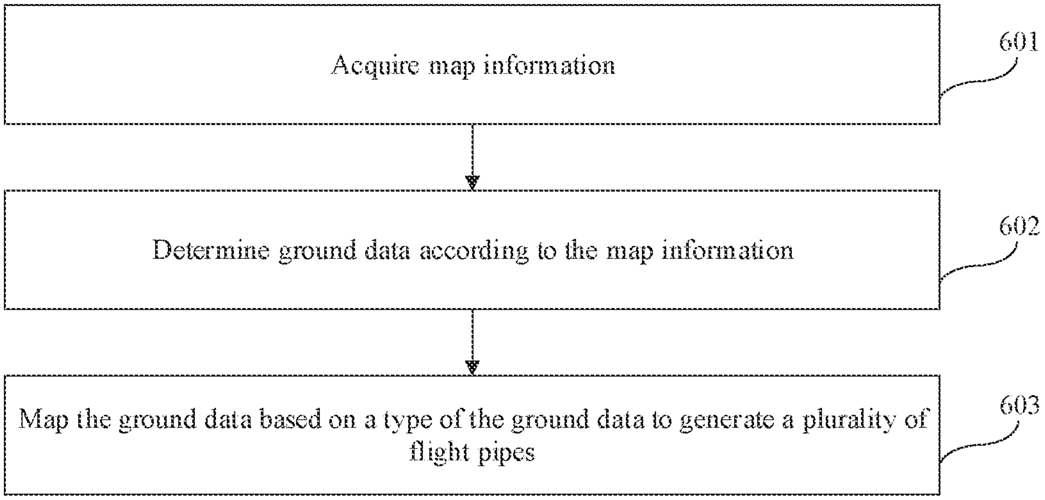
FIG. 6 is a flowchart of a method for generating a flight pipe according to an embodiment of the present disclosure.

In addition, based on the implementation environment shown in FIG. 1, an embodiment of the present disclosure also provides a method for generating a flight pipe. This method may be applied to the server shown in FIG. 1. It should be noted that the flight pipe generated by this method may be used as the initial flight pipe mentioned above, so as to realize the acquisition of the initial flight pipes mentioned above. Referring to FIG. 6, the method includes the following steps:

Step 601: Acquire map information.

Figure 7:
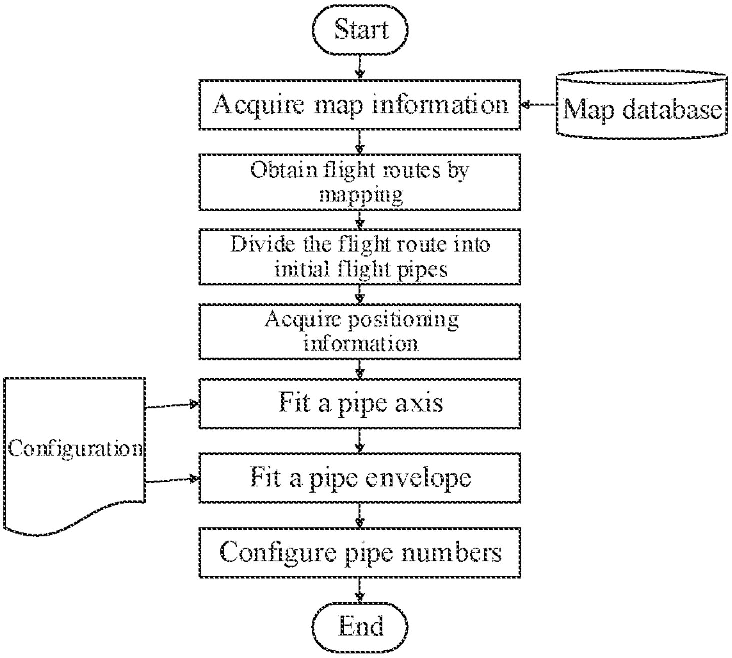
FIG. 7 is a flowchart of a method according to an embodiment of the present disclosure.

As shown in FIG. 7, the server may acquire map information from a map database. In an implementation, the map database may be stored locally on the server, so that the server can acquire the map information by reading the map database locally. Alternatively, the map database may be stored on another server platform, and the server may send a map information acquisition request to the another server platform and receive map information returned by the another server platform according to the acquisition request, thereby achieving the acquisition of the map information.

Step 602: Determine ground data according to the map information.

The ground data includes one or two of a road network and an area that does not include any road network. The road network includes, but is not limited to, a road, street, railway, hill, river, etc. The area that does not include any road network may be a forest, farmland, lake, sea, etc. Because there are often no obstacles such as buildings that aircrafts need to avoid in the determined various roads and areas, flight pipes for flight of aircrafts may be determined directly based on the above roads and areas, see step 603 for details.

Step 603: Map the ground data based on a type of the ground data to generate a plurality of flight pipes.

In an implementation, the method of mapping the ground data varies with the type of the ground data. In response to the ground data including the road network, the mapping method includes: mapping the road network to obtain one or more flight routes; and dividing the one or more flight routes into a plurality of non-overlapping flight pipes.

Figure 8:
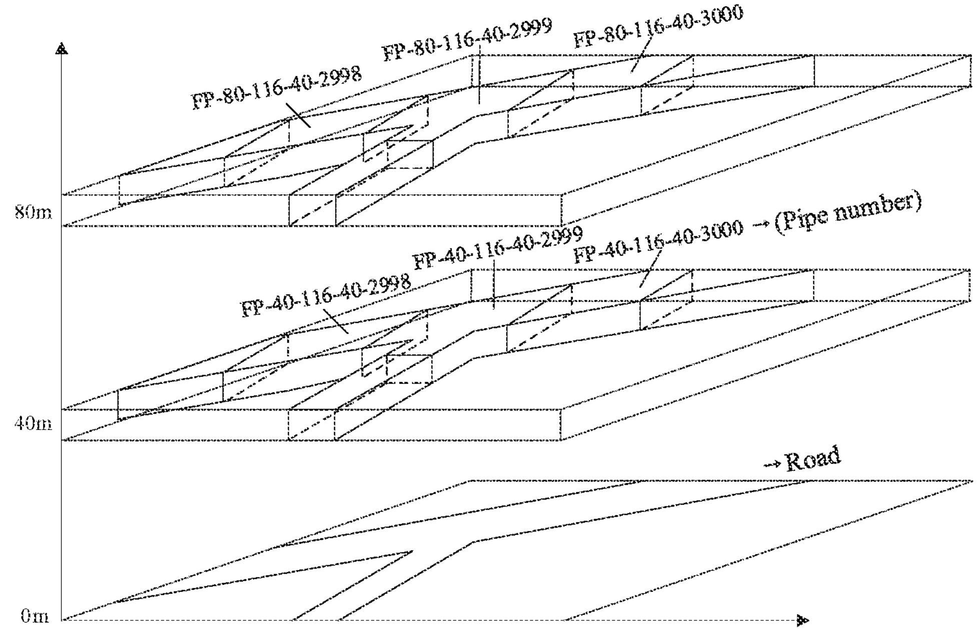
FIG. 8 is a schematic diagram showing a mapping according to an embodiment of the present disclosure.

Referring to FIG. 8, various roads determined according to the map information may be mapped into the airspace to obtain one or more flight routes. In response to the number of flight routes being more than one, the multiple flight routes may cross each other or be parallel to each other. A same road may be mapped to different heights in the airspace. For example, in FIG. 8, a same road is mapped to a height of 40 meters and a height of 80 meters in the airspace. In addition, referring to FIG. 9, in response to a width of the road being greater than a threshold, the road may further be mapped to a route with multi-lane in parallel, such as a dual-lane route, a three-lane route, etc.

Figure 9:
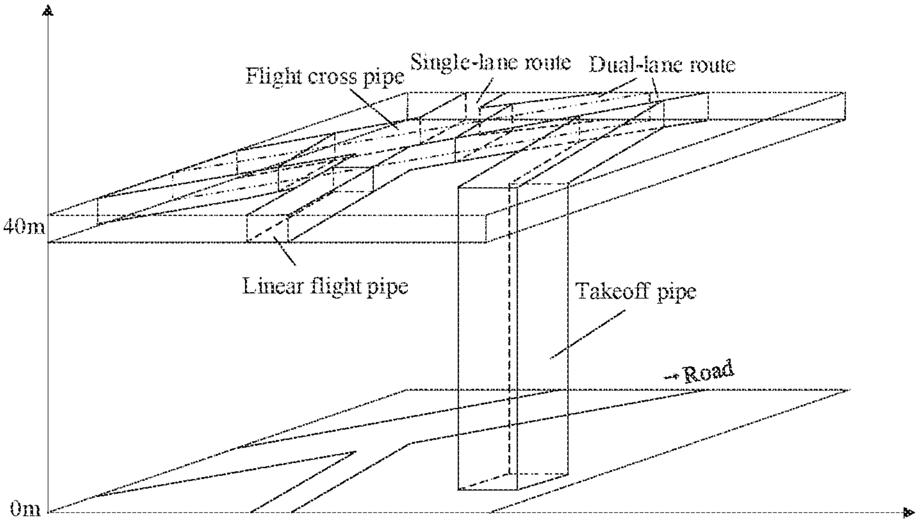
FIG. 9 is a schematic diagram showing a mapping according to an embodiment of the present disclosure.

After the flight routes are obtained by mapping, the flight routes are further divided to obtain a plurality of flight pipes that do not overlap each other. Referring to FIG. 9, for two crossing flight routes, the intersection may be defined as a flight cross pipe, and parts of any flight route other than the intersection may be divided at intervals of the reference distance to obtain linear flight pipes in the form of a straight line or a curve. The division method is not limited in this embodiment. After the division is completed, a plane mapping of the plurality of flight pipes may be as shown in FIG. 4. In FIG. 4, thicker lines represent multi-lane routes, and thinner lines represent single-lane routes. A larger dot represents a flight cross pipe formed by an intersection between multi-lane routes (or between a multi-lane route and a single-lane route), and a smaller dot represents a flight cross pipe formed by an intersection between single-lane routes. It should be noted that FIG. 4 is merely a schematic diagram of part of the flight pipes, and in practice, the number and connection relationship of the flight pipes may be different from that in FIG. 4.

In addition, in response to the ground data including the area not including any road network, the mapping method includes: dividing the area that does not include any road network to obtain a plurality of sub-areas; and mapping each sub-area to one flight pipe, to generate a plurality of flight pipes.

In an implementation, the area that does not include any road network may be divided according to a reference rule to obtain the plurality of sub-areas. The reference rule may include a reference shape and a reference size, so that the shapes and sizes of the sub-areas obtained by the division satisfy the reference rule. For example, if the reference shape is a square and the reference size is a reference side length, the sub-areas obtained by the division are all squares with the same side length. The reference rule may be set based on experience or based on an actual situation of the area that does not include any road network. For example, the reference shape may be set according to the actual shape of the area that does not include any road network, and the reference size may be set according to the actual size of the area that does not include any road network. The setting of the reference rule is not limited in this embodiment. In addition, the shapes and sizes of the plurality of sub-areas obtained by the division according to the reference rule may be the same or different.

After the plurality of sub-areas are obtained, each sub-area may be mapped to one flight pipe in the airspace, thereby obtaining a plurality of flight pipes. Of course, the sub-areas may also be mapped to different heights in the airspace, so that the plurality of flight pipes obtained are located at different heights in the airspace.

Figure 10:
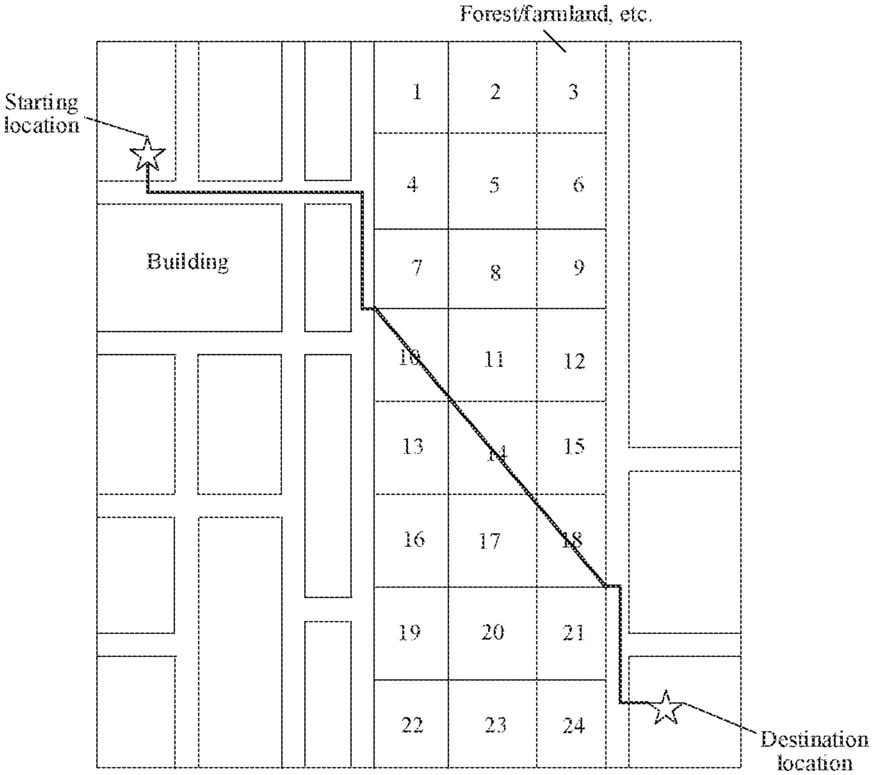
FIG. 10 is a schematic diagram showing a mapping according to an embodiment of the present disclosure.

In response to the ground data including both the road network and the area that does not include any road network, the road network and the area that does not include any road network may be mapped respectively to obtain a plane mapping as shown in FIG. 10. In a practical application, in response to the existence of an area that does not include any road network between the starting location and the destination location of the target aircraft, the flight path of the target aircraft may be determined by alternately using the flight pipes obtained by mapping of the road network and the flight pipes obtained by mapping of the sub-areas. Taking labels shown in FIG. 10 as an example, first, a segment of flight path may be determined according to the flight pipes obtained by mapping of the road network, then a segment of flight path may be determined according to the flight pipes 10, 14 and 18 obtained by mapping of the sub-areas, and finally a segment of flight path may be determined again according to the flight pipes obtained by mapping of the road network, so as to finally obtain a flight path for the target aircraft to fly from the starting location to the destination location.

In an exemplary embodiment, after the plurality of flight pipes are obtained, the method further includes: for any flight pipe, acquiring positioning information on the flight pipe; determining a pipe parameter of the flight pipe according to the positioning information, where the pipe parameter includes a pipe axis or geometric information of the flight pipe; and setting a pipe number of the flight pipe based on the pipe parameter, and managing the flight pipe according to the pipe number, where the pipe number is used for uniquely identifying the flight pipe.

For any flight pipe, one or more pieces of positioning information may be acquired according to the shape of the flight pipe. For example, when the shape of the flight pipe is linear, positioning information of multiple points on the same straight line or curve may be acquired between the two ends of the flight pipe. In a case where the shape of the flight pipe is non-linear, positioning information of a geometric center and a side length of the flight pipe may also be acquired. Then, the pipe parameter may be determined based on the acquired positioning information. In a case where the flight pipe is linear, a pipe axis may be obtained by fitting according to the acquired positioning information, and the pipe axis may be used as the pipe parameter. The pipe axis is expressed by an equation of degree N, where N is a positive integer not less than 0. In a case where the flight pipe is non-linear, the acquired positioning information may be directly used as the pipe parameter, i.e., geometric information such as the geometric center and the side length may be used as the pipe parameter.

Then, referring to FIG. 7, the pipe number of the flight pipe may be set based on the pipe parameter, for example, the pipe number may be set to "pipe parameter-longitude-latitude". Of course, the method of setting the pipe number is not limited in this embodiment, and any method may be adopted as long as the flight pipe can be uniquely identified. In addition to the above-mentioned setting method of "pipe parameter-longitude-latitude", referring to FIG. 8, the pipe number may also be set to "FP-mapping height-longitude-latitude-serial number". FP is the abbreviation of Flight Pipe. For example, "FP-40-116-40-2998" in FIG. 8 represents the $2298^{th}$ flight pipe with a mapping height of 40 meters, a longitude of 116, and a latitude of 40.

The flight pipes can be managed through the pipe numbers set for the flight pipes. For example, for any flight pipe, the pipe attribute information and the occupancy information of the flight pipe may be stored in correspondence with the pipe number of the flight pipe, thereby forming a flight pipe database. In a practical application, the corresponding pipe attribute information and occupancy information can be queried from the flight pipe database based on the pipe number of the flight pipe, which facilitates the dispatching and use of the flight pipes in the airspace.

Further, after the pipe parameter is obtained, a pipe envelope may further be fitted based on the pipe parameter, where the pipe envelope is a virtual pipe wall of the flight pipe. The function of fitting the pipe envelope is to accurately represent the three-dimensional space included in the flight pipe. In the fitting process, the pipe envelope may be obtained by fitting based on the actual shape of the flight pipe. Alternatively, the shape and size of the radial section of the flight pipe may be set according to actual needs or experience, and the pipe envelope is obtained by fitting based on the radial section of the pipe. The shape and size of the radial section are not limited in this embodiment. For example, the shape of the radial section may be a circle, a rectangle, a polygon, or the like. Taking the shape of the radial section being a circle as an example, the radius size of the circle (such as 3 meters, 5 meters, etc.) may be set according to experience or actual needs, so as to obtain a cylindrical flight pipe by fitting.

It should be noted that the initial flight pipes in step 201 to step 204 may be acquired in other manners than the mapping-based generation method described in steps 601-603. For example, in this embodiment, the airspace may be divided directly, so as to realize the acquisition of the initial flight pipes.

To sum up, in this embodiment, flight pipes are generated by mapping of one or two of the road network and the area that does not include any road network. Since there are often no obstacles such as buildings that aircrafts need to avoid in the road network and the area that does not include any road network, the determined flight pipes are suitable for flight of the aircraft. In addition, the generation method is convenient and quick, which is not only easy to popularize, but also beneficial to the planning and management of the airspace.

Figure 14:
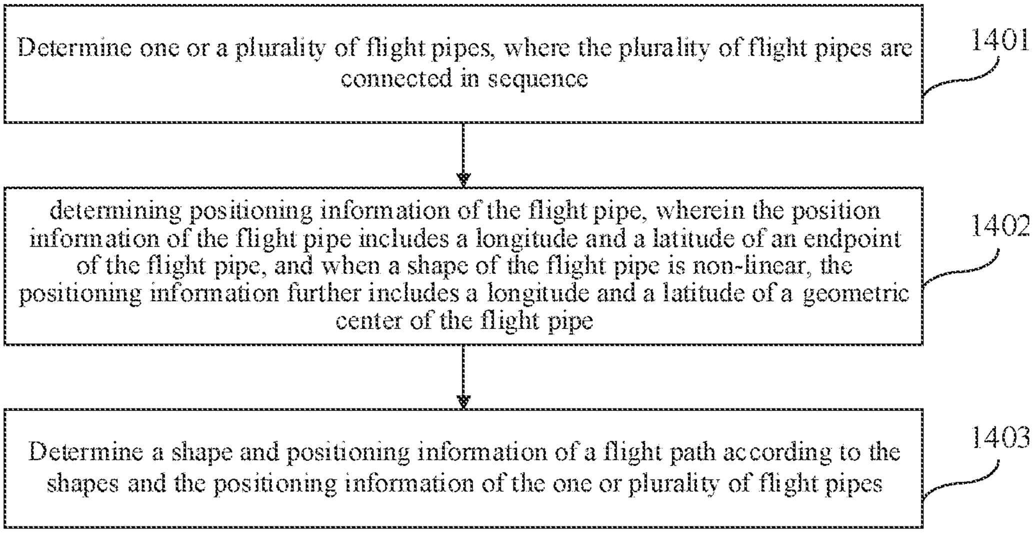
FIG. 14 is a flowchart of a method for determining a flight path according to an embodiment of the present disclosure.

In addition, based on the implementation environment shown in FIG. 1, an embodiment of the present disclosure also provides a method for determining a flight path. This method may be applied to the server shown in FIG. 1. This method is easy to popularize and is beneficial to the planning and management of the airspace. Referring to FIG. 14, this method includes the following steps 1401-1403.

Step 1401: Determine one or a plurality of flight pipes, where the plurality of flight pipes are connected in sequence.

Step 1402: determining positioning information of the flight pipe, wherein the position information of the flight pipe includes a longitude and a latitude of an endpoint of the flight pipe, and when a shape of the flight pipe is non-linear, the positioning information further includes a longitude and a latitude of a geometric center of the flight pipe.

In the embodiments of the present disclosure, when the shape of the flight pipe is linear, the positioning information of the flight pipe includes but is not limited to a longitude and a latitude of an endpoint of the flight pipe. When the shape of the flight pipe is non-linear, the positioning information of the flight pipe includes but is not limited to a longitude and a latitude of an endpoint of the flight pipe and the longitude and the latitude of the geometric center of the flight pipe. For the longitude, latitude, and geometric center, reference may be made to the description corresponding to FIG. 6 above, and the details will not be repeated here.

Step 1403: Determine a shape and positioning information of a flight path according to the shapes and the positioning information of the one or plurality of flight pipes.

When the number of flight pipes is one, the shape of the flight pipe is determined as the shape of the flight path, and the positioning information of the flight pipe is determined as the positioning information of the flight path. When the number of flight pipes is more than one, the shape and the positioning information of the flight path are determined based on the shapes and the positioning information of the plurality of flight pipes. In some embodiments, when the shapes of the plurality of flight pipes are linear, it is determined that the shape of the flight path is a polyline, and it is determined that the positioning information of the flight path includes longitudes and latitudes of a plurality of endpoints of the polyline.

In some embodiments, each of the flight pipes corresponds to an aircraft pass-by time. Based on the description corresponding to FIG. 2 above, it can be known that an occupancy start time corresponding to a flight pipe is an estimated time when an aircraft starts to occupy the flight pipe. Correspondingly, the aircraft pass-by time of a flight pipe may be a time period after a time at which an aircraft in the flight pipe starts to occupy the flight tube (i.e., the occupancy start time). The length of the time period is not limited in the embodiments of the present disclosure. The length of the time period may be set according to experience or actual needs. Moreover, based on the description corresponding to FIG. 2 above, it can also be known that the sequence of the occupancy start times is the same as a spatial sequence, and the spatial sequence is the spatial sequence of the flight pipes in the flight path. Because the aircraft pass-by time is determined based on the occupancy start time, the spatial sequence of the flight pipes in the flight path is the same as the sequence of the aircraft pass-by times.

In some embodiments, the method further includes: determining weather information corresponding to the flight path according to attributes of the one or plurality of flight pipes. The attribute of the flight pipeline is, for example, the pipe attribute information in the description corresponding to FIG. 2 above, and the pipeline attribute information includes but is not limited to weather. Therefore, for a flight path, weather information corresponding to the flight path can be determined according to weather of the flight pipes included in the flight path.

Figure 11:
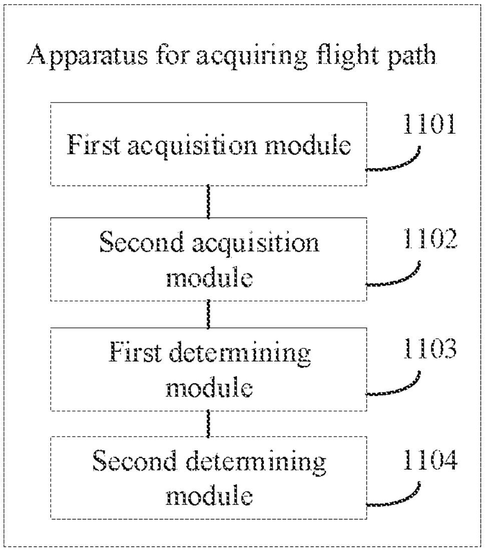
FIG. 11 is a schematic structural diagram of an apparatus for acquiring a flight path according to an embodiment of the present disclosure.

An embodiment of the present disclosure provides an apparatus for acquiring a flight path. Referring to FIG. 11, the apparatus includes:

- a first acquisition module 1101, configured to acquire a flight path acquisition request of a target aircraft, where the flight path acquisition request includes a starting location and a destination location of the target aircraft;
- a second acquisition module 1102, configured to acquire one or more reference flight pipes based on the starting location and the destination location, where each reference flight pipe corresponds to pipe attribute information;
- a first determining module 1103, configured to determine occupancy information of the reference flight pipes by other aircrafts; and
- a second determining module 1104, configured to determine a target flight pipe from the reference flight pipes according to the pipe attribute information and the occupancy information, and acquire a target flight path of the target aircraft based on the target flight pipe.

Optionally, the second acquisition module 1102 is configured to acquire initial flight pipes; and determine the reference flight pipes from the initial flight pipes based on the starting location and the destination location.

Optionally, the second determining module 1104 is configured to obtain an undirected graph of the reference flight pipes based on a connection relationship between the reference flight pipes by taking the reference flight pipes as endpoints; determine a cost function value of each endpoint based on the pipe attribute information and the occupancy information; and determine the endpoint with a smallest sum of cost function values between the starting location and the destination location as the target flight pipe.

Optionally, the second determining module 1104 is configured to use the one or more reference flight pipes as endpoints, where any reference flight pipe corresponds to at least one endpoint; in response to the number of the reference flight pipes being more than one, obtain an undirected graph based on a connection relationship between different reference flight pipes and the endpoints; determine a cost function value of each endpoint in the undirected graph based on the pipe attribute information and the occupancy information; and determine the reference flight pipe corresponding to the endpoint with a smallest sum of cost function values between the starting location and the destination location as the target flight pipe.

Optionally, each target flight pipe corresponds to one occupancy start time, and the second determining module 1104 is configured to determine a takeoff pipe of the target aircraft according to the starting location and a location of the target flight pipe corresponding to a smallest occupancy start time among the target flight pipes; determining a landing pipe of the target aircraft according to the destination location and a location of the target flight pipe corresponding to a largest occupancy start time among the target flight pipes; and use the takeoff pipe, the target flight pipe, and the landing pipe as the target flight path.

Optionally, the apparatus further includes: a detection module, configured to, for any target flight pipe, acquire updated pipe attribute information and updated occupancy information of the target flight pipe at a current moment in response to detecting that the target aircraft arrives at the target flight pipe; and allow the target aircraft to enter the target flight pipe in response to determining that the target flight pipe is available according to the updated pipe attribute information and the updated occupancy information.

Optionally, the apparatus further includes: an update module, configured to determine an updated target flight path in response to determining that the target flight pipe is unavailable according to the updated pipe attribute information and the updated occupancy information; and send the updated target flight path to the target aircraft.

Optionally, the apparatus further includes: a prediction module, configured to predict a reference time for the target aircraft to enter the target flight pipe; acquire an actual flight time of the target aircraft; and determine that the target aircraft reaches the target flight pipe in response to detecting that a difference between the actual flight time of the target aircraft and the reference time is less than a threshold.

Based on the above, the airspace is quantified using the reference flight pipes, and the target flight path of the target aircraft is determined based on the pipe attribute information of the reference flight pipes and the occupancy information of the reference flight pipes by other aircrafts. Therefore, the target aircraft flies according to the target flight path determined by the method provided in the embodiments of the present disclosure, which can avoid collisions with other aircrafts, thereby not only ensuring flight safety, but also achieving centralized management and scheduling of aircrafts in the airspace.

Figure 12:
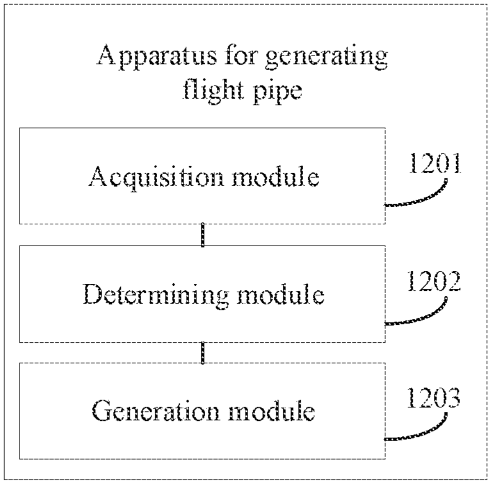
FIG. 12 is a schematic structural diagram of an apparatus for generating a flight pipe according to an embodiment of the present disclosure.

An embodiment of the present disclosure provides an apparatus for generating a flight pipe. Referring to FIG. 12, the apparatus includes:

- an acquisition module 1201, configured to acquire map information;
- a determining module 1202, configured to determine ground data according to the map information, where the ground data includes one or two of a road network and an area that does not include any road network; and
- a generation module 1203, configured to map the ground data based on a type of the ground data to generate a plurality of flight pipes.

Optionally, in response to the ground data including the road network, the generation module 1203 is configured to map the road network to obtain one or more flight routes; and divide the one or more flight routes into a plurality of non-overlapping flight pipes.

Optionally, in response to the ground data including the area that does not include any road network, the generation module 1203 is configured to divide the area that does not include any road network to obtain a plurality of sub-areas; and map each sub-area to one flight pipe, to generate a plurality of flight pipes.

Optionally, the apparatus further includes: a management module, configured to, for any flight pipe, acquire positioning information on the flight pipe; determine a pipe parameter of the flight pipe according to the positioning information, where the pipe parameter includes a pipe axis or geometric information of the flight pipe; and set a pipe number of the flight pipe based on the pipe parameter, and manage the flight pipe according to the pipe number, where the pipe number is used for uniquely identifying the flight pipe.

To sum up, in this embodiment, flight pipes are generated by mapping of one or two of the road network and the area that does not include any road network. Since there are often no obstacles such as buildings that aircrafts need to avoid in the road network and the area that does not include any road network, the determined flight pipes are suitable for flight of the aircraft. In addition, the generation method is convenient and quick, which is not only easy to popularize, but also beneficial to the planning and management of the airspace.

It should be noted that when the apparatus provided by the above embodiments implements its functions, the description is given by taking the above division of functional modules as an example. In practice, the above functions may be assigned to be implemented by different functional modules according to needs, i.e., the internal structure of the apparatus may be divided into different functional modules to implement all or part of the functions described above. In addition, the apparatus provided by the above embodiments belongs to the same concept as the method embodiments. For its specific implementation process, see the method embodiments for details, which will not be repeated here.

Figure 13:
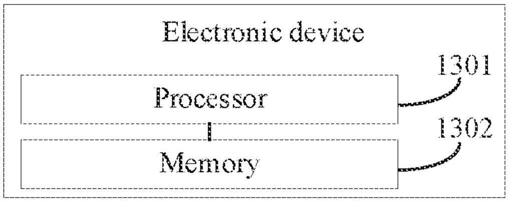
FIG. 13 is a schematic structural diagram of an electronic device according to an embodiment of the present disclosure.

Referring to FIG. 13, an embodiment of the present disclosure provides an electronic device. The electronic device includes a processor 1301 and a memory 1302. The memory 1302 stores at least one instruction therein, and the at least one instruction is loaded and executed by the processor 1301 to implement the method for acquiring a flight path, the method for generating a flight pipe, or the method for determining a flight path according to any one of the possible implementations of the present disclosure.

An embodiment of the present disclosure provides a non-transitory computer-readable storage medium, storing at least one instruction therein, where the at least one instruction is loaded and executed by a processor to implement the method for acquiring a flight path, the method for generating a flight pipe, or the method for determining a flight path according to any one of the possible implementations of the present disclosure.

An embodiment of the present disclosure provides a computer program or computer program product, including: computer instructions, where the computer instructions, when executed by a computer, cause the computer to implement the method for acquiring a flight path, the method for generating a flight pipe, or the method for determining a flight path according to any one of the possible implementations of the present disclosure.

All the foregoing optional technical solutions may be arbitrarily combined to form an optional embodiment of the present disclosure, and details are not described herein again.

A person of ordinary skill in the art may understand that all or some of steps of the embodiments may be implemented by hardware or a program instructing related hardware. The program may be stored in a non-temporary computer-readable storage medium. The non-temporary computer-readable storage medium mentioned above may be a read-only memory (ROM), a magnetic disk, an optical disc, or the like.

The foregoing descriptions are merely embodiments of the present disclosure, and are not intended to limit the embodiments of the present disclosure. Any modification, equivalent replacement, or improvement made within the principle of the embodiments of the present disclosure shall fall within the protection scope of the embodiments of the present disclosure.

What is claimed is:

1. A method for acquiring a flight path, the method comprising:

- acquiring a flight path acquisition request of a target aircraft, wherein the flight path acquisition request comprises a starting location and a destination location of the target aircraft;
- acquiring one or more reference flight pipes based on the starting location and the destination location, wherein each reference flight pipe corresponds to pipe attribute information;

determining occupancy information of the reference flight pipes by other aircrafts; and determining a target flight pipe from the reference flight pipes according to the pipe attribute information and the occupancy information, and acquiring a target flight path of the target aircraft based on the target flight pipe, wherein each target flight pipe corresponds to one occupancy start time, and the acquiring a target flight path of the target aircraft based on the target flight pipe comprises:

determining a takeoff pipe of the target aircraft according to the starting location and a location of the target flight pipe corresponding to a smallest occupancy start time among the target flight pipes;

determining a landing pipe of the target aircraft according to the destination location and a location of the target flight pipe corresponding to a largest occupancy start time among the target flight pipes; and using the takeoff pipe, the target flight pipe, and the landing pipe as the target flight path; and wherein the target aricraft flies according to the target flight path.

2. The method according to claim 1, wherein the acquiring one or more reference flight pipes based on the starting location and the destination location comprises:

acquiring initial flight pipes; and determining the reference flight pipes from the initial flight pipes based on the starting location and the destination location.

3. The method according to claim 2, wherein the determining a target flight pipe from the reference flight pipes according to the pipe attribute information and the occupancy information comprises:

using the one or more reference flight pipes as endpoints, wherein any reference flight pipe corresponds to at least one endpoint;

in response to the number of the reference flight pipes being more than one, obtaining an undirected graph based on a connection relationship between different reference flight pipes and the endpoints;

determining a cost function value of each endpoint in the undirected graph based on the pipe attribute information and the occupancy information; and determining the reference flight pipe corresponding to the endpoint with a smallest sum of cost function values between the starting location and the destination location as the target flight pipe.

4. The method according to claim 1, wherein after the acquiring a target flight path of the target aircraft based on the target flight pipe, the method further comprises:

for any target flight pipe, acquiring updated pipe attribute information and updated occupancy information of the target flight pipe at a current moment in response to detecting that the target aircraft arrives at the target flight pipe; and allowing the target aircraft to enter the target flight pipe in response to determining that the target flight pipe is available according to the updated pipe attribute information and the updated occupancy information.

5. The method according to claim 4, wherein the method further comprises:

determining an updated target flight path in response to determining that the target flight pipe is unavailable according to the updated pipe attribute information and the updated occupancy information; and sending the updated target flight path to the target aircraft.

6. The method according to claim 4, wherein before the acquiring updated pipe attribute information and updated occupancy information of the target flight pipe at a current moment, the method further comprises:

predicting a reference time for the target aircraft to enter the target flight pipe;

acquiring an actual flight time of the target aircraft; and determining that the target aircraft reaches the target flight pipe in response to detecting that a difference between the actual flight time of the target aircraft and the reference time is less than a threshold.

7. An electronic device, comprising a processor and a memory, the memory storing at least one instruction, the at least one instruction being loaded and executed by the processor to implement the method according to claim 1.

* * * * *